United States Patent [19]

Schweim

[11] 4,226,338
[45] Oct. 7, 1980

[54] LIVE BAIT DISPENSER

[75] Inventor: Donald E. Schweim, Mankato, Minn.

[73] Assignee: King Minnow, Inc., Mankato, Minn.

[21] Appl. No.: 868,027

[22] Filed: Jan. 9, 1978

[51] Int. Cl.² .............................................. A01K 97/04
[52] U.S. Cl. .................... 222/162; 222/205; 222/334; 222/355; 43/56
[58] Field of Search ............... 222/162, 355, 205, 334; 43/56, 57

[56] References Cited
U.S. PATENT DOCUMENTS

| 2,474,745 | 6/1949 | Lewis | 222/355 X |
| 3,372,784 | 3/1968 | Ross et al. | 43/56 X |
| 3,834,062 | 9/1974 | Nalepica | 43/56 |

Primary Examiner—David A. Scherbel
Assistant Examiner—Frederick R. Handren
Attorney, Agent, or Firm—Williamson, Bains, Moore & Hansen

[57] ABSTRACT

A perforated basket containing live bait is immersed in a tank of water. Upon selection by the consumer, the basket is lifted clear of the water and gravity causes the bait to fall into and fill a bait receiving pocket. The basket is then lowered leaving a predetermined amount of bait in the bait receiving pocket. At this point the bait receiving pocket is opened thereby dispensing a predetermined amount of live bait into the fisherman's bucket along with a predetermined amount of water.

5 Claims, 5 Drawing Figures

LIVE BAIT DISPENSER

BRIEF SUMMARY OF THE INVENTION

This invention relates to a device for dispensing live bait for use in fishing. In the past when faced with the need to purchase live bait, the fisherman has generally been required to go to a bait shop where the bait is generally kept in a tank of water. There, a bait store employee is generally required to dip into the tank with a net and pull out an indeterminate amount of bait. The employee is then required to count or otherwise measure one portion of bait into the fisherman's bucket. The drawbacks of such a method are of course well known. First, this requires time on the part of a bait store employee for the dipping and measuring. Secondly, the amount of bait dispensed will have a tendency to be inconsistent as will happen with any human operation. Last, the fisherman is dependent on the presence of a bait store and for such a store to be open in order to acquire the bait.

It is a primary object of this invention to provide a bait dispensing device which will dispense a predetermined amount of bait in a consistent fashion to the fisherman. It is further an object of this invention to provide a device which will perform the aforesaid object economically and with a minimal amount of maintenance.

In the preferred form of my invention a perforated basket containing live bait is normally immersed in a tank of water. Upon actuation by the consumer, a double acting hydraulic cylinder lifts the basket clear of the water thereby allowing the water to drain through the perforations in the basket. A sloping basket bottom provides a gravity feed of the bait into a bait measuring device located in the side of the tank when it is in the lifted position. A predetermined amount of bait therefore fills the bait measuring device whereupon the basket is then lowered. Upon lowering, the bait measuring device, which is formed by a cup, is lifted and the bait is dispensed down a chute into a fisherman's bucket. Exhaust water from the double acting hydraulic cylinder is dispensed down the chute along with the bait in order to provide the fisherman with suitable water for carrying the bait. Conventional coin operated dispensing apparatus is used to actuate the novel bait dispensing device.

These and other objects and advantages of my invention will become readily apparent as the following description is read in conjunction with the accompanying drawings wherein like reference numerals are used to describe the several views.

DESCRIPTION OF THE DRAWING FIGURES

FIG. 1 is a perspective view of the bait dispensing device showing the front door opened.

FIG. 2 is a sectional view taken along lines 2—2 of FIG. 1.

FIG. 3 is a vertical sectional view taken along lines 3—3 of FIG. 2.

FIG. 5 is a sectional view taken along lines 5—5 of FIG. 4 and showing the particular arrangement of the bait measuring device.

DESCRIPTION OF THE PREFERRED EMBODIMENT

Figures 1, 2, 3, 5:
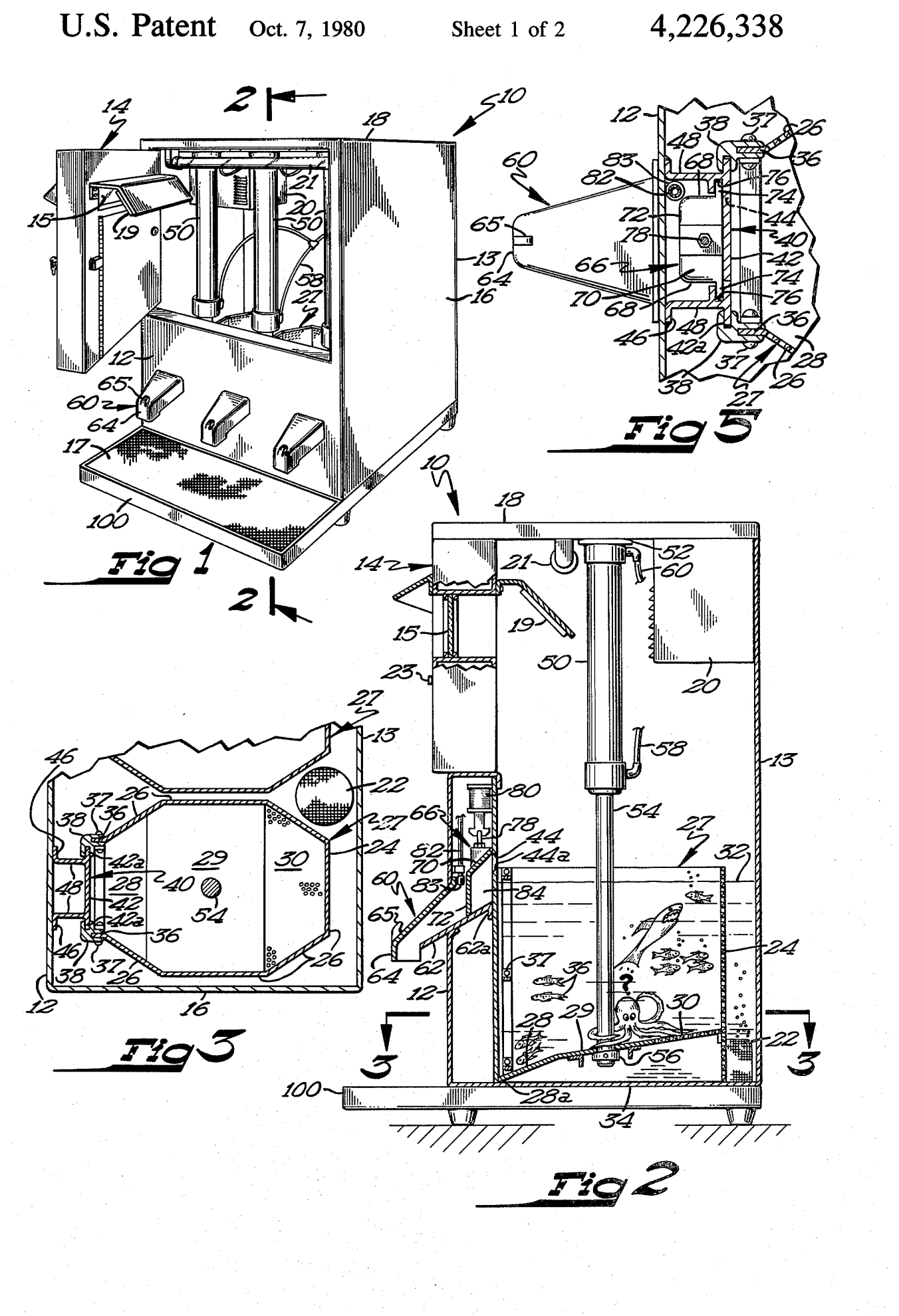
Figure 4:
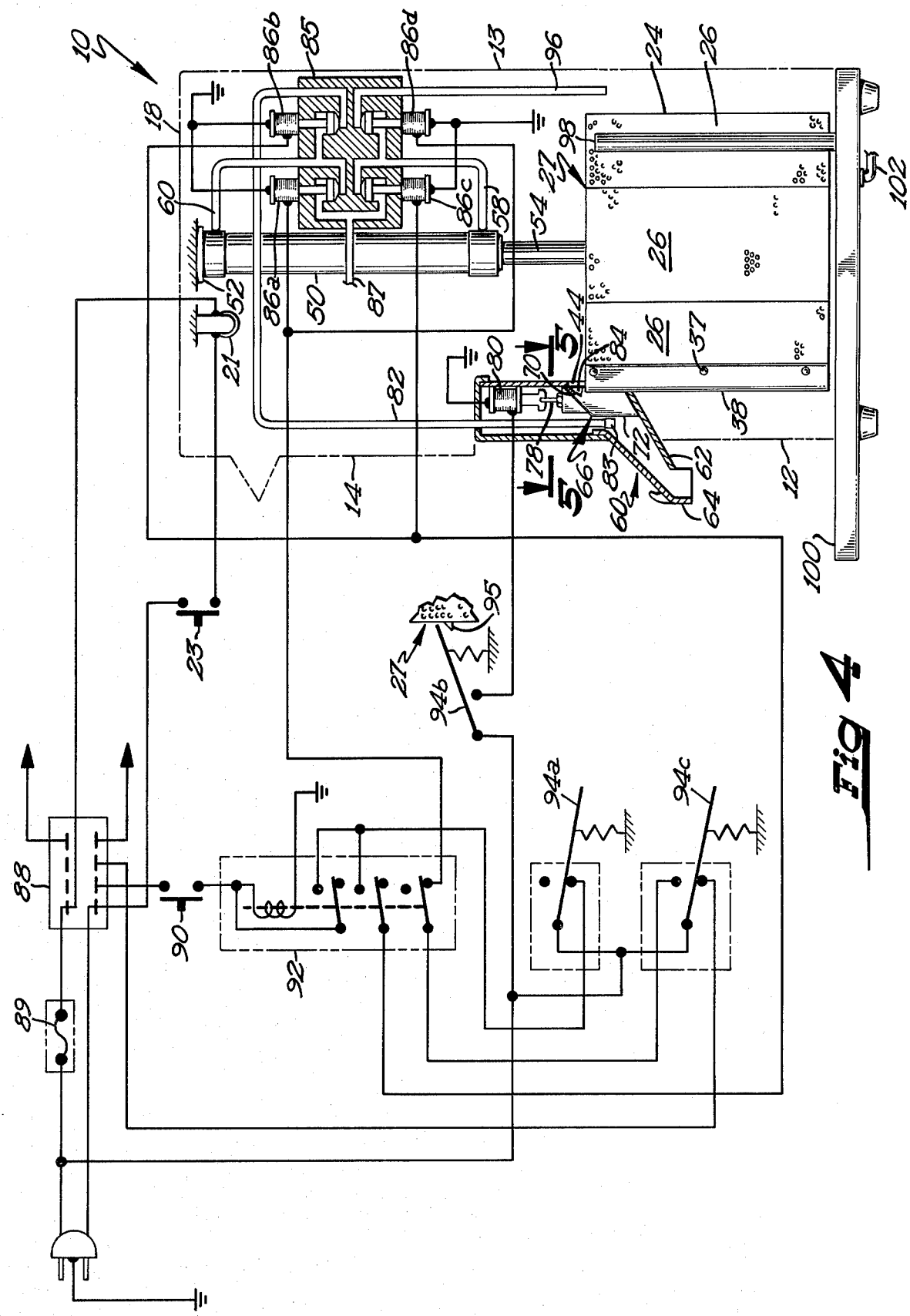
FIG. 4 shows a general hydraulic and electrical schematic of the invention.

The bait dispensing device 10 is comprised generally of a rectangular cabinet having a front wall 12 having located therein a double-walled door 14, side walls 16, rear wall 13 and top 18. Inside the cabinet is provided a conventional air conditioning unit 20 for regulating the temperature inside the cabinet. Inside the cabinet are located three baskets 24 having a generally octagonal cross section. Baskets 24 have an open top and seven perforated side walls. The eighth side wall is formed by bait basket guide plate 42 as more fully described below. The perforations are of such size as to allow free flow of water in and out of the basket while at the same time retaining the live bait inside the basket. The bottom 27 of the basket 24 comprises three sections 28, 29 and 30 as shown particularly in FIGS. 2 and 3. As shown in FIG. 2 section 28 slopes more steeply than do sections 29 and 30 which have the same slope. Sections 28 and 29 are essentially imperforate while section 30 is perforated in a manner similar to side walls 26. When not being operated, the basket rests on the bottom 34 of the cabinet which is filled with water and which has a water level 32. The top of basket 24 extends slightly above water level 32 in order that the bait 36 may be contained therein. As shown in FIG. 1, there are three such baskets 24 which may be used to provide either an assortment of sizes of bait or alternatively any desired combination of sizes of bait. Of course the number of baskets and associated apparatus may vary according to the wishes of the user.

A double door 14 is provided in the front wall 12 of the bait dispenser. Door 14 contains conventional coin-vending appparatus of the sort well known in the art. Also most of the electrical equipment is located within the door. A window 15 is provided in door 14 to assist in viewing of the bait. Mounted on the rear of door 14 is mirror 19 which is placed at approximately a 45-degree angle such that a user wishing to observe the condition of the bait in the machine will look through window 15 and thereby see the contents in the bait baskets below. An overhead light 21 is included to assist in the viewing process and may be actuated by switch 23 mounted on the front panel of door 14.

As shown in FIGS. 2 and 3 small aerators 22 are placed at the bottom of and between the baskets 24 in order to provide a proper environment for the bait. Of course any conventional aerator may be used for this purpose.

One side of bait basket 24 is open forming a basket aperture and the sides of the opening are formed by flanges 36; affixed to flanges 36 (best seen in FIG. 3) by rivets 37 or other conventional means is a dual slotted moulding 38 which extends for approximately the height of the basket. Basket 24 slides vertically upon and is spaced from the front of the cabinet by spacer member 40 which comprises a bait basket guide plate 42 of a planar nature having a bait opening 44 located slightly above water level 32. Further comprising spacer member 40 are spacer plates 48 and spacer flanges 46. Spacer flanges 46 are affixed to the front 12 of the cabinet by any conventional means. Mouldings 38 then slide vertically upon the outer edges 42a of the bait basket guide plate 32.

A vertically extending, double action hydraulic cylinder 50 is provided and mounted at end 52 to top wall 18 of the cabinet. Extending from the other end of cylinder 50 is piston rod 54 which is secured to panel 29 of bait basket bottom 27 by flange 56. Hydraulic cylinder 50 acts to raise and lower the basket in conjunction with the sliding action of mouldings 18 along bait basket guide plate 42. Hydraulic cylinder 50 is provided with an upper end inlet/outlet 60 and at the opposite end with a lower end inlet/outlet 58. While most any conventional double acting cylinder may be used for the purpose, in the preferred form of this invention a light weight plastic construction may be utilized to enhance economy of manufacture.

As shown in FIG. 2 a bait chute 60 is provided having a lower wall 62. Lower wall 62 at one end 62a contacts the bait basket guide plate 42 at a point slightly below bait opening 44 and extends outwardly and downwardly through front wall 12 of the machine and terminates in a bait spout 64.

A bait measuring device 66 is mounted in the space intermediate front panel 12 and the bait basket guide plate 42 (FIGS. 2, 4 and 5). The bait measuring device 66 comprises a four-sided cup having two sides 68, a top 70 and a front wall 72. As shown in FIG. 5 the bait measuring device 66 is also provided with a pair of flanges 74 on side walls 68. The bait basket guide plate 42 is provided with a pair of grooves 76 in which the bait measuring device is vertically, slidably located. The bait measuring device 66 slides vertically within groove 76 and in its normal, resting position the bottom of front wall 72 rests on the bottom wall 62 of bait chute 60. A conventional straight line solenoid 80 is provided for vertically lifting the bait measuring device 66 from its resting position. Solenoid 80 is attached via connecting link 78 to the top 70 of the bait measuring device 66. Also provided intermediate front panel 12 and bait basket guide plate 42 is water dispenser 82 which provides a measured amount of water down the chute while the bait is dispensed.

The bait measuring device 66 acts, in conjunction with guide plate 42, to form a pocket 84 or bait measuring container having a predetermined volume for measuring the bait. The pocket 84 is bounded by front wall 72, side walls 68 and top wall 70 of the bait measuring device as well as bottom wall 62 of bait chute 60 and a portion of bait basket guide plate 42. When the bait measuring device 66 is in its resting position the only opening into the pocket 84 is through the bait opening 44 in the upper side of pocket 84.

While above the bait measuring device has been described as a cup-like member, any structure that in effect forms a gate across the chute and which acts in conjunction with the chute walls and bottom to form a bait measuring container will be suitable. Towards that end the general expression gate means is meant to encompass all such structures.

The dispensing device of the instant invention is also provided as shown in FIG. 4 with a conventional coin vending machine apparatus 88 which accepts coins and counts the coins such that when a predetermined amount is inserted further circuitry will be activated for use in the vending operation. As aforementioned a push button switch 23 is provided on the front panel of double-sided door 14 for actuation by the fisherman in order to inspect the bait. One or more selection switches 90 are provided on the front panel for actuation of the particular basket and associated mechanism associated with the size of bait desired. A solenoid operated relay 92 is provided for operation in conjunction with the three microswitches 94A, 94B and 94C. Microswitch 94A is activated upon the basket reaching the top of its travel. Microswitch 94C is tripped when the basket returns to the bottom of the tank. 94B is a one way acting microswitch which is tripped only by downward travel of nib 95 past the switch.

Water level 32 is kept at a constant level by any of a variety of well known means. Such means can include a standpipe 98 and drain (not shown) and a float valve (also not shown) for maintaining the water level at the proper height. Such means are entirely conventional and any other similar means may be used. A block 85 containing four solenoid valves 86A, 86B, 86C and 86D is provided for operation of the device in conjunction with the associated electrics. Input line 87 is connected to a pressurized source of water such as a conventional tap and leads to solenoids 86A and 86C. Upper end inlet/outlet 60 is connected to solenoids 86A and 86B and lower end inlet/outlet 58 is connected to solenoid valves 86C and 86D. Drain line 96 which empties into the tank is connected to solenoid valve 86D; while line 82 leading to the bait spout 62 is connected to solenoid valve 86B. An aerator 83 is provided on the end of line 82 in order to insure a proper supply of aerated water to the fisherman's bucket. A drainage tray 100 is provided at the bottom of front wall 12 for catching excess or spilled water from the dispensing operation. Tray 100 is connected to a drain via connector 102 and covered by screen 17.

OPERATION OF THE DEVICE

In order to operate the device a fisherman first views the bait by pressing switch 23 on the front panel of door 14 thereby operating light 21 and enabling the fisherman to inspect the bait inside via angled mirror 19. The fisherman than inserts his money into a standard coin-vending apparatus 88 and then selects the type of bait from among the three baskets available by passing the proper selector button 90. (FIG. 4). Upon pressing this button relay 92 is energized and solenoids 86B and 86C are energized thereby opening the associated valve. Thus, pressurized water flows through inlet 87 through solenoid valve 86C and into the lower end inlet/outlet 58 of hydraulic cylinder 50 which thereby raises piston rod 54 and basket 24 at the same time. At the same time water exhausts from the upper end 60 of hydraulic cylinder 50 and passes through energized solenoid valve 86B and thence through line 82 down the bait chute 62. As piston rod 54 pulls basket 24 upwardly, basket 24 and moulding 38 slide upwardly along side flanges 42A of bait basket guide plate 42. When edge 28A of bottom 27 of bait basket 24 is even with the bottom of bait opening 44 upper limit travel microswitch 94A is tripped thereby deenergizing solenoid valve 86B and 86C as well as flipping latch relay 92 to the down mode where solenoid valves 86A and 86D are energized. At this point line water pressure is applied from inlet line 87 to solenoid valve 86A whereupon it passes to the upper end 60 of hydraulic cylinder 50 thereby forcing piston rod 54 downward. Concurrently solenoid valve 86D is opened and water from the bottom side of the double acting hydraulic cylinder 50 is exhausted through line 58 then through solenoid valve 86D and out line 96 into the tank of the bait dispensing device thereby providing a shot of fresh water into the system for every time the dispense cycle is operated. In the meanwhile when the basket 24 is at the top of its stroke the bait has been lifted clear of the water and the water is drained out of basket 24 through the holes therein.

Through the action of gravity the bait is drawn toward the left of FIG. 4 and hence downwardly through bait opening 44 and into pocket 84 of bait measuring device 66. As the basket moves downward a measured amount of bait will remain trapped within pocket 84 since at that time there is no outlet. When basket 24 reaches a point approximately six inches below the top of its travel, microswitch 94B is tripped in the downward direction thereby energizing solenoid 80 which lifts bait measuring device 66 via connecting link 78. Since there is no bottom as such to bait measuring device 66 other than the bottom wall 62 of chute 60 the bait will then be unrestrained and will fall downwardly under the action of gravity and out bait spout 64. A hook 65 is provided on the end of bait spout 60 so that the fisherman's bucket may be hung there if so desired. Upon basket 24 reaching the bottom of its stroke microswitch 94C is activated which thereby deenergizing solenoid valves 86A and 86D and further acts to complete the vend cycle by deenergizing all of the associated components, including solenoid 80.

It is understood of course that many and various changes may be made to the apparatus of the instant invention without departing from the spirit thereof. Specifically the manner in which the basket is moved and in which the various components or sequence can be performed by any number of various apparatuses well known to those in the art.

What is claimed is:

1. An apparatus for dispensing live bait, the apparatus comprising:
   a water tank;
   a basket for restraining live bait therein, said basket being located in said tank and said basket comprising:
   means permitting free water flow into and out of said basket when said basket is immersed in water and allowing drainage when said basket is removed from said water;
   first and second sides;
   a bottom sloping downwardly from said first side to said second side;
   a basket bait aperture located in said basket second side adjacent said basket bottom;
   means for lifting said basket from the water, said lifting means having an upper limit of travel;
   a bait dispensing chute comprising:
   first and second ends;
   a bottom and two sides, said chute bottom sloping downwardly from said first end to said second end, said bottom of said chute first end being fixed no higher than said basket bottom second end and said basket bait aperture when said basket is at said travel upper limit;
   gate means located intermediate said chute ends for selectively impeding passage through said chute, said gate means having open and closed positions;
   such that when said gate means is in said closed position and said basket is lifted to said upper limit, bait will fall through said basket bait aperture and into said chute thereby filling
   a bait measuring container of predetermined volume formed by said gate means and the portion of said chute between said gate and said chute first end and such that when said basket is lowered and said gate means moved to said open position, the bait in said predetermined volume will be dispensed.

2. The apparatus of claim 1 further comprising a bait basket guide plate having two faces wherein said basket is vertically slideably mounted on one of said faces and wherein one wall of said bait measuring container is formed by a portion of the other of said faces.

3. The apparatus of claim 2 wherein said other face has said bait filling aperture located therein.

4. The apparatus of claim 1 wherein said lifting means comprises a double acting water-operated hydraulic cylinder for vertically positioning said basket and wherein the exhaust water from said cylinder is directed down said bait delivery chute to assist in the bait dispensing operation.

5. The apparatus of claim 1 wherein the exhaust water from the upward stroke of said cylinder is directed down said chute.

* * * * *

UNITED STATES PATENT AND TRADEMARK OFFICE
CERTIFICATE OF CORRECTION

PATENT NO. : 4,226,338
DATED : October 7, 1980
INVENTOR(S) : Donald E. Schweim

It is certified that error appears in the above–identified patent and that said Letters Patent are hereby corrected as shown below:

Col. 4, Line 37:

Delete "passing" and substitute --pressing--.

Signed and Sealed this

Twenty-third Day of December 1980

[SEAL]

Attest:

SIDNEY A. DIAMOND

Attesting Officer

Commissioner of Patents and Trademarks